(12) United States Patent
Morita et al.

(10) Patent No.: US 8,508,186 B2
(45) Date of Patent: Aug. 13, 2013

(54) CHARGING SYSTEM FOR TRANSPORTATION SYSTEM WITHOUT CONTACT WIRE

(75) Inventors: Katsuaki Morita, Hiroshima (JP); Hiroshi Ogawa, Mihara (JP); Kyotaro Onishi, Mihara (JP); Hidehito Yamanaka, Mihara (JP); Hiroshi Yamashita, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 208 days.

(21) Appl. No.: 13/002,085

(22) PCT Filed: Sep. 2, 2008

(86) PCT No.: PCT/JP2008/065762
§ 371 (c)(1),
(2), (4) Date: Dec. 30, 2010

(87) PCT Pub. No.: WO2010/026622
PCT Pub. Date: Mar. 11, 2010

(65) Prior Publication Data
US 2011/0109267 A1    May 12, 2011

(51) Int. Cl.
*H02J 7/00*    (2006.01)

(52) U.S. Cl.
USPC .......................................... 320/109; 320/108

(58) Field of Classification Search
USPC ....................................................... 320/109
See application file for complete search history.

(56) References Cited

U.S. PATENT DOCUMENTS 5,821,731 A * 10/1998 Kuki et al. ..................... 320/108
6,741,065 B1 * 5/2004 Ishii et al. ..................... 320/122

FOREIGN PATENT DOCUMENTS

| JP | 48-31674 | 4/1973 |
|---|---|---|
| JP | 7-5889 | 1/1995 |
| JP | 7-255133 | 10/1995 |
| JP | 11-285109 | 10/1999 |
| JP | 2000-083302 | 3/2000 |
| JP | 2002-281610 | 9/2002 |
| JP | 2006-054958 | 2/2006 |

OTHER PUBLICATIONS

Japanese Notice of Allowance issued Mar. 30, 2012 in corresponding Japanese Patent Application No. 2010-527607 with concise explanation.
International Search Report issued Dec. 9, 2008 in International (PCT) Application No. PCT/JP2008/065762.
Notice of Allowance dated Jun. 19, 2012 in corresponding Korean Patent Application No. 2011-7000390 with English translation.

* cited by examiner

*Primary Examiner* — Drew A Dunn
*Assistant Examiner* — Robert Grant
(74) *Attorney, Agent, or Firm* — Wenderoth, Lind & Ponack, L.L.P.

(57) ABSTRACT

The present invention provides a charging system for a transportation system without a contact wire having a configuration in which a power storage device of a vehicle is charged by a charging device provided on the ground when the vehicle equipped with the power storage device stops at a station on a track. In the present invention, the track includes a first track and a second track, the station includes a station controller which detects stopping of the vehicle, the charging device includes a first power line for supplying power to a vehicle on the first track and a second power line for supplying power to a vehicle on the second track, the first power line and the second power line each include switching means for controlling flow of the power supplied from the charging device, and the station controller controls the switching means, thereby causing the charging device to charge any of the vehicle on the first track and the vehicle on the second track.

2 Claims, 4 Drawing Sheets

FIG.4

| | | 37a | 37b | 38a | 38b |
|---|---|---|---|---|---|
| USING BOTH SYSTEMS | UP LINE ONLY | ON | OFF | OFF | OFF |
| | DOWN LINE ONLY | OFF | ON | OFF | OFF |
| | SIMULTANEOUS CHARGING IN UP LINE AND DOWN LINE | ON | OFF | OFF | ON |
| USING FIRST SYSTEM | UP LINE ONLY | ON | OFF | OFF | OFF |
| | DOWN LINE ONLY | OFF | ON | OFF | OFF |
| USING SECOND SYSTEM | UP LINE ONLY | OFF | OFF | ON | OFF |
| | DOWN LINE ONLY | OFF | OFF | OFF | ON |

CHARGING SYSTEM FOR TRANSPORTATION SYSTEM WITHOUT CONTACT WIRE

TECHNICAL FIELD

The present invention relates to a transportation system without a contact wire in which a vehicle runs on a track by being supplied with power from a charging device provided on the ground, and in particular, relates to a charging system for charging a power storage device of the vehicle when the vehicle stops at a station on the track.

BACKGROUND ART

In a transportation system in which a vehicle runs on a set track, a transportation system without a contact wire has been recently proposed which uses a vehicle running without being supplied with power from overhead wires (for example, see Patent Document 1 and Patent Document 2).

Patent Document 1 discloses a transportation system without a contact wire with a configuration in which a charging device is installed on the ground. The charging device comprises a charging part including a primary core and a primary coil wound around the primary core, a charging power source for supplying high frequency power to the primary coil, a communication part for outputting charging information received from a vehicle-mounted communication part, and a controlling part for controlling the charging power, the charging voltage, the charging time, and the like on the basis of the received charging information.

In such a configuration, the power storage device of a vehicle is charged by supplying the high frequency power to the primary coil when the vehicle stops at a station.

Patent Document 2 discloses a transportation system without a contact wire with a configuration in which a vehicle-mounted controller controlling the charging voltage and the like is mounted on a vehicle. The vehicle includes a power storage device, a moveable power receiving part, and the vehicle-mounted controller for controlling the charging voltage, the charging time, and the like.

In such a configuration, when the vehicle stops at a power feeding facility (charging device) of a station to receive power, the power receiving part of the vehicle contacts a power feeding part provided in the power feeding facility. Then, the charging of the power storage device is started in accordance with an instruction from the vehicle-mounted controller provided in the vehicle. When the power storage amount of the power storage device reaches a predetermined value, the vehicle-mounted controller outputs a power receiving stop instruction to the power receiving part. Then, the power receiving part of the vehicle is moved away from the power feeding part, and the connection between the power receiving part and the power storage device is cut off.

[Patent Document 1] Japanese Patent Application Publication No. 2006-54958

[Patent Document 2] Japanese Patent Application Publication No. 2000-83302

SUMMARY OF THE INVENTION

Problems to be Solved by the Invention

In the above configuration of Patent Document 1, however, in the case of a station having multiple tracks such as an up line and a down line, for example, vehicles stopping on the respective tracks are different from each other in terms of the state of the power storage device and the like. Thus, the charging device needs to be controlled for each of the vehicles. Accordingly, in the configuration of Patent Document 1, the charging device needs to be provided for each track, thereby increasing the equipment cost.

Moreover, in the above configuration of Patent Document 2, the controller for controlling the charging voltage, the charging time, and the like is provided separately from the charging device, and is mounted on each of the vehicles. Thus, as many controllers as the vehicles are required, thereby increasing the equipment cost.

The present invention is made in view of the above circumstances, and an object of the present invention is to provide a charging system for a transportation system without a contact wire capable of, in a station with multiple tracks, charging a vehicle on each track while reducing the equipment cost.

Means for Solving the Problems

In order to solve the problems of the above conventional techniques, the present invention provides a charging system for a transportation system without a contact wire having a configuration in which a power storage device of a vehicle is charged by a charging device provided in the ground when the vehicle equipped with the power storage device stops at a station on a track. The charging system is characterized in that the track includes a first track and a second track, the station includes a station controller which detects stopping of the vehicle, the charging device includes a first power line for supplying power to a vehicle on the first track and a second power line for supplying power to a vehicle on the second track, the first power line and the second power line each include switching means for controlling flow of the power supplied from the charging device, and the station controller controls the switching means, thereby causing the charging device to charge any of the vehicle on the first track and the vehicle on the second track.

Another embodiment of the present invention provides a charging system for a transportation system without a contact wire having a configuration in which a power storage device of a vehicle is charged by a charging device provided on the ground when the vehicle equipped with the power storage device stops at a station on a track. The charging system is characterized in that the track includes a first track and a second track, the station includes a station controller which detects stopping of the vehicle, the charging device includes a first charger and a second charger, the first charger includes a first power line for supplying power to a vehicle on the first track and a second power line for supplying power to a vehicle on the second track, the second charger includes a third power line for supplying power to the vehicle on the first track and a fourth power line for supplying power to the vehicle on the second track, the first power line and the second power line each include first switching means for controlling flow of the power supplied from the first charger, the third power line and the fourth power line each include second switching means for controlling flow of the power supplied from the second charger, and the station controller controls the first switching means and the second switching means, thereby causing the charging device to charge any one or both of the vehicle on the first track and the vehicle on the second track.

Effects of the Invention

According to the charging system for a transportation system without a contact wire of the present invention, the track includes a first track and a second track, the station includes a station controller which detects stopping of the vehicle, the charging device includes a first power line for supplying power to a vehicle on the first track and a second power line for supplying power to a vehicle on the second track, the first power line and the second power line each include switching means for controlling flow of the power supplied from the charging device, and the station controller controls the switching means, thereby causing the charging device to charge any of the vehicle on the first track and the vehicle on the second track. This configuration allows, in a station with multiple tracks, one charging device to charge the vehicles on the respective tracks without provision of a charging device for each of the tracks. Accordingly, even when the charging device is provided in the station with multiple tracks, the equipment cost can be reduced.

Moreover, the station controller (ATO) heretofore provided in the station is used to control the switching means. Thus, unlike the conventional techniques, there is no need to provide a controller separately from a charging device. Accordingly, the equipment cost can be reduced.

Moreover, according to the charging system for a transportation system without a contact wire of another embodiment of the present invention, the track includes a first track and a second track, the station includes a station controller which detects stopping of the vehicle, the charging device includes a first charger and a second charger, the first charger includes a first power line for supplying power to a vehicle on the first track and a second power line for supplying power to a vehicle on the second track, the second charger includes a third power line for supplying power to the vehicle on the first track and a fourth power line for supplying power to the vehicle on the second track, the first power line and the second power line each include first switching means for controlling flow of the power supplied from the first charger, the third power line and the fourth power line each include second switching means for controlling flow of the power supplied from the second charger, and the station controller controls the first switching means and the second switching means, thereby causing the charging device to charge any one or both of the vehicle on the first track and the vehicle on the second track. This configuration allows the following in a station with multiple tracks. Even in a case in which the vehicle stops on each of the first track and the second track, both vehicles can be charged at the same time. Moreover, the vehicle on each of the tracks can be charged by any of the first charger and the second charger by controlling the first switching means and the second switching means.

Moreover, the station controller (ATO) heretofore provided in the station is used to control the first switching means and the second switching means. Thus, unlike the conventional techniques, there is no need to provide a controller separately from a charging device. Accordingly, the equipment cost can be reduced.

Moreover, two chargers of the first charger and the second charger are provided. Thus, even when one of the chargers cannot be used due to failure or the like, the other charger can be used as a backup.

BRIEF DESCRIPTION OF THE DRAWINGS

FIG. 4 is a table showing combinations of settings of switching means when the vehicle on each of tracks is charged in the charging system for a transportation system without a contact wire according to the second embodiment of the present invention.

Figure 1:
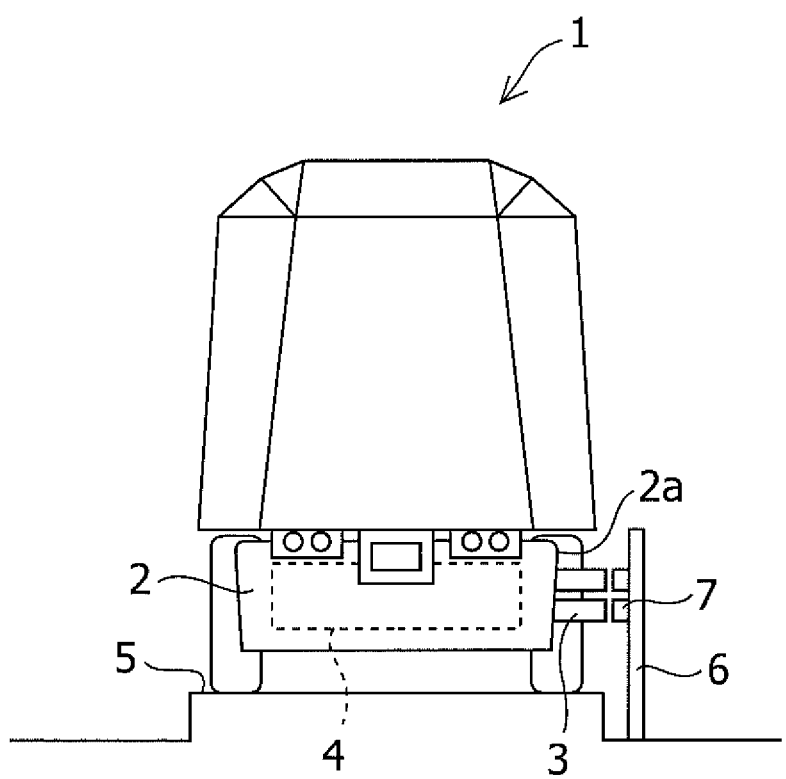
FIG. 1 is a view of a vehicle in a transportation system without a contact wire according to embodiments of the present invention, the vehicle seen in the traveling direction thereof.

EXPLANATIONS OF REFERENCE NUMERALS 1 vehicle
2 bogie
3 power collecting contact
4 power storage device
5 track
6 support frame
7 power feeding contact
10, 30 charging system
11 up line
12 down line
13 station
14 charging device
15 three-phase transformer
16 thyristor rectifier
17 current detector
18 voltage detector
19 controller
20, 21, 33, 34, 35, 36, power line
24a, 24b, 37a, 37b, 38a, 38b switching means
25 station controller
26 communication device
31, 32 charger

DETAILED DESCRIPTION OF THE INVENTION

A charging system for a transportation system without a contact wire according to the present invention will be described with reference to the drawings. FIG. 1 is a view of a vehicle 1 in the transportation system without the contact wire according to embodiments of the present invention, the vehicle 1 seen in the traveling direction thereof.

The vehicle 1 in the transportation system without the contact wire according to the embodiments of the present invention includes a bogie 2 at a lower portion thereof. A power collecting contact 3 for receiving electric power is provided in a side surface 2a of the bogie 2. In addition, the bogie 2 includes a power storage device 4 for storing electric power received by the power collecting contact 3. The vehicle 1 stores the electric power in the power storage device 4 upon stopping at a station (not shown), and runs on a set track 5.

A support frame 6 is provided on the ground in a manner standing adjacent to the track 5. A power feeding contact 7 is provided in the support frame 6 at such a position that the power feeding contact 7 faces the power collecting contact 3 when the vehicle 1 stops. The power feeding contact 7 is connected, through a power line (not shown) buried underground, to a charging device (not shown) provided on the ground.

According to the above configuration, when the vehicle 1 stops at a station, the power collecting contact 3 and the power feeding contact 7 come into contact with each other, and thereby, electric power supplied from the charging device on the ground is stored in the power storage device 4.

First Embodiment

Figure 2:
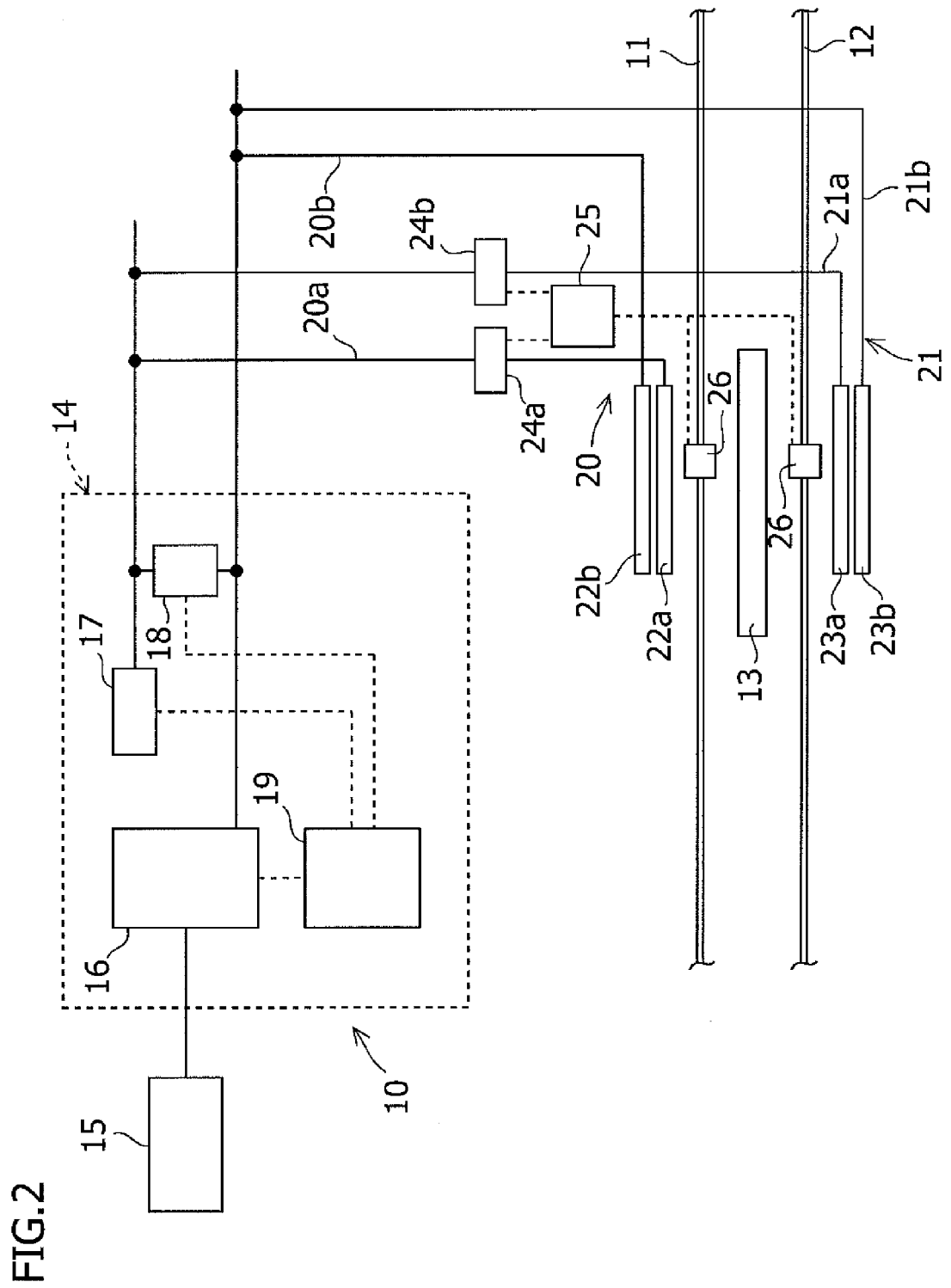
FIG. 2 is a schematic view of a charging system for a transportation system without a contact wire according to a first embodiment of the present invention.

FIG. 2 is a schematic view of a charging system 10 of a transportation system without a contact wire according to a first embodiment of the present invention.

The charging system 10 of the present embodiment is used for vehicles (not shown) which stop at a station 13 provided with an up line (first track) 11 and a down line (second track) 12 arranged in parallel.

As shown in FIG. 2, a charging device 14 is provided on the ground in the charging system 10 of the present embodiment. The charging device 14 receives AC power supplied from a substation (not shown) through a three-phase transformer 15.

The charging device 14 includes a thyristor rectifier 16, a current detector 17, a voltage detector 18, and a controller 19. The thyristor rectifier 16 converts the AC power flowing via the three-phase transformer 15 into DC current. The current detector 17 detects the DC current obtained by rectification by the thyristor rectifier 16. Meanwhile, the voltage detector 18 detects DC voltage obtained by rectification by the thyristor rectifier 16. The current detector 17 and the voltage detector 18 are connected to the controller 19, and each transmits a detected value to the controller 19.

The controller 19 is connected to the thyristor rectifier 16, and controls the amount of power flowing in the thyristor rectifier 16 on the basis of the detected values of the current detector 17 and the voltage detector 18.

Additionally, as shown in FIG. 2, the charging device 14 includes a first power line 20 wired to the up line 11 and a second power line 21 wired to the down line 12.

The first power line 20 is formed of a positive side wiring 20a and a negative side wiring 20b. The positive side wiring 20a and the negative side wiring 20b are connected respectively to a positive side power feeding contact 22a and a negative side power feeding contact 22b for the up line 11. This allows the power storage device (not shown) of the vehicle to be charged by DC power supplied from the charging device 14 when the vehicle stops on the up line 11.

On the other hand, the second power line 21 is formed of a positive side wiring 21a and a negative side wiring 21b. The positive side wiring 21a and the negative side wiring 21b are connected respectively to a positive side power feeding contact 23a and a negative side power feeding contact 23b for the down line 12. This allows the power storage device of the vehicle to be charged by the DC power supplied from the charging device 14 when the vehicle stops on the down line 12.

As shown in FIG. 2, the positive side wiring 20a of the first power line 20 is provided with switching means 24a which controls the flow of the DC power supplied from the charging device 14. On the other hand, the positive side wiring 21a of the second power line 21 is provided with switching means 24b which controls the flow of the DC power supplied from the charging device 14. Each of the switching means 24a, 24b is configured to cause power to flow when set to ON, and to cause power not to flow when set to OFF.

As shown in FIG. 2, the station 13 includes a station controller (ATO: Automatic Train Operation system) 25. Here, the station controller 25 is a device which automates the driving of the vehicle and the like, and, for example, automatically controls the opening and the closing of a vehicle door when the vehicle stops at the station 13.

A communication device 26 is provided on each of the up line 11 and the down line 12 of the station 13, and is connected to the station controller 25. The communication device 26 sends the station controller 25 information on a vehicle when it stops.

Moreover, the station controller 25 is connected to the switching means 24a, 24b, and controls the switching means 24a, 24b on the basis of the information received from the communication devices 26.

In the above configuration, for example, when the vehicle stops on the up line 11, the communication device 26 of the up line 11 firstly sends the station controller 25 information on the stopped vehicle. Next, the station controller 25 sets the switching means 24a to ON while setting the switching means 24b to OFF. This allows the charging device 14 to charge only the vehicle on the up line 11.

On the other hand, when the vehicle stops on the down line 12, the communication device 26 of the down line 12 firstly sends the station controller 25 information on the stopped vehicle. Next, the station controller 25 sets the switching means 24a to OFF while setting the switching means 24b to ON. This allows the charging device 14 to charge only the vehicle on the down line 12.

As described above, the charging system 10 of the transportation system without the contact wire according to the first embodiment is configured as follows. The station 13 is provided with the up line 11 and the down line 12 arranged in parallel, the station 13 includes the station controller 25 which detects stopping of the vehicle, the charging device 14 includes the first power line 20 supplying power to the vehicle on the up line 11 and the second power line 21 supplying power to the vehicle on the down line 12, the first power line 20 and the second power line 21 respectively include the switching means 24a, 24b controlling the flow of power supplied from the charging device 14, and the station controller 25 controls the switching means 24a, 24b to cause the charging device 14 to charge any vehicle on the up line 11 and vehicle on the down line 12. This configuration allows, in the station 13 with the multiple lines 11, 12, one charging device 14 to charge the vehicles on the up line 11 and the down line 12, respectively, without provision of a charging device for each of the lines 11, 12. Accordingly, the equipment cost can be reduced.

Moreover, the station controller 25 heretofore provided in the station is used to control the switching means 24a, 24b. Thus, unlike the conventional techniques, there is no need to provide a controller separately from a charging device. Accordingly, the equipment cost can be reduced.

In addition, in the charging system 10 of the transportation system without the contact wire according to the first embodiment, the charging device 14 includes the thyristor rectifier 16, the current detector 17, the voltage detector 18, and the controller 19. Thus, the controller 19 can control the amount of power flowing in the thyristor rectifier 16 on the basis of the detected values of the current detector 17 and the voltage detector 18. This allows the power to be supplied from the charging device 14 to be controlled in accordance with the configuration and the state of the power storage device of the vehicle stopped on each of the lines 11, 12.

Furthermore, the thyristor rectifier 16 is used in the charging device 14. Accordingly, the charging device 14 can serve both to convert the AC power to the DC power and to control charging power. Thus, the charging device 14 can be configured more simply and at lower cost.

Second Embodiment

Figure 3:
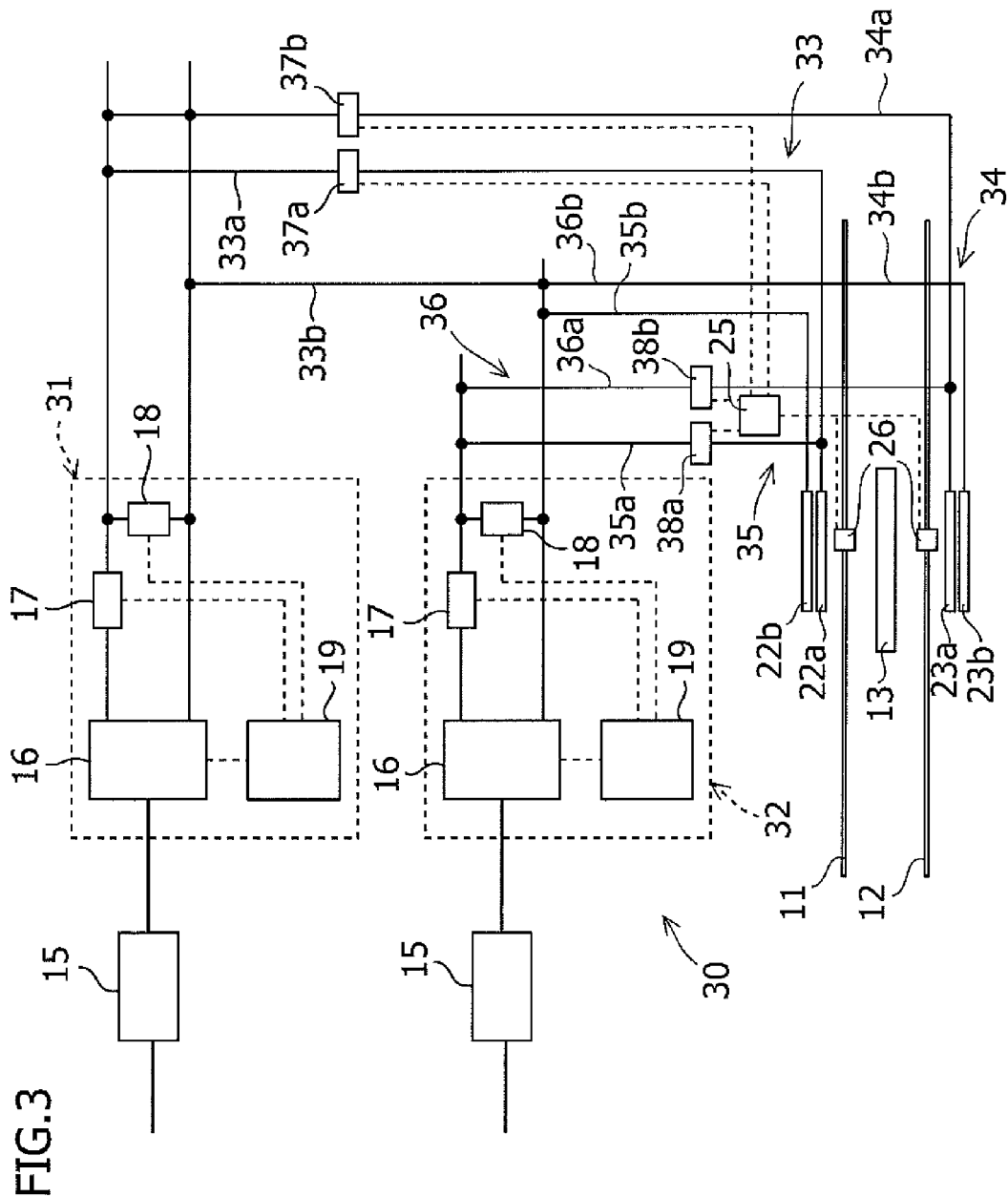
FIG. 3 is a schematic view of a charging system for a transportation system without a contact wire according to a second embodiment of the present invention.

Next, a charging system for a transportation system without a contact wire according to a second embodiment of the present invention will be described using FIG. 3. FIG. 3 is a schematic view of the charging system 30 of the transportation system without the contact wire according to the second embodiment of the present invention.

Note that, components which are similar to those described in the above first embodiment are denoted with the same reference numerals, and repeated descriptions thereof are omitted.

As shown in FIG. 3, the charging system 30 according to the present embodiment is used for vehicles (not shown) stopping at the station 13 provided with the up line 11 and the down line 12 arranged in parallel.

As shown in FIG. 3, the charging system 30 according to the present embodiment includes a first charger 31 and a second charger 32. The first charger 31 and the second charger 32 each have the same configuration as the charging device 14 of the above first embodiment.

As shown in FIG. 3, the first charger 31 includes a first power line 33 wired to the up line 11, and a second power line 34 wired to the down line 12.

The first power line 33 is formed of a positive side wiring 33a and a negative side wiring 33b. The positive side wiring 33a and the negative side wiring 33b are connected respectively to the positive side power feeding contact 22a and the negative side power feeding contact 22b for the up line 11. This allows the power storage device (not shown) of the vehicle to be charged by DC power supplied from the first charger 31 when the vehicle stops on the up line 11.

On the other hand, the second power line 34 is formed of a positive side wiring 34a and a negative side wiring 34b. The positive side wiring 34a and the negative side wiring 34b are connected respectively to the positive side power feeding contact 23a and the negative side power feeding contact 23b for the down line 12. This allows the power storage device of the vehicle to be charged by the DC power supplied from the first charger 31 when the vehicle stops on the down line 12.

Furthermore, as shown in FIG. 3, the second charger 32 includes a third power line 35 wired to the up line 11, and a fourth power line 36 wired to the down line 12.

The third power line 35 is formed of a positive side wiring 35a and a negative side wiring 35b. The positive side wiring 35a and the negative side wiring 35b are connected respectively to the positive side power feeding contact 22a and the negative side power feeding contact 22b for the up line 11. This allows the power storage device (not shown) of the vehicle to be charged by DC power supplied from the second charger 32 when the vehicle stops on the up line 11.

On the other hand, the fourth power line 36 is formed of a positive side wiring 36a and a negative side wiring 36b. The positive side wiring 36a and the negative side wiring 36b are connected respectively to the positive side power feeding contact 23a and the negative side power feeding contact 23b for the down line 12. This allows the power storage device of the vehicle to be charged by the DC power supplied from the second charger 32 when the vehicle stops on the down line 12.

Note that, as shown in FIG. 3, part of the wirings of the first power line 33, the second power line 34, the third power line 35, and the fourth power line 36 are configured to be integrated. For example, the negative side wiring 33b of the first power line 33 is configured to share wiring with the negative side wiring 35b of the third power line 35, and the negative side wiring 34b of the second power line 34 is configured to share wiring with the negative side wiring 36b of the fourth power line 36.

Moreover, the positive side wiring 33a of the first power line 33 is provided with first switching means 37a which controls the flow of the DC power supplied from the first charger 31. On the other hand, the positive side wiring 34a of the second power line 34 is provided with first switching means 37b which controls the flow of the DC power supplied from the first charger 31. Each of the first switching means 37a, 37b is configured to cause power to flow when set to ON, and to cause power not to flow when set to OFF.

Furthermore, the positive side wiring 35a of the third power line 35 is provided with second switching means 38a which controls the flow of the DC power supplied from the second charger 32. On the other hand, the positive side wiring 36a of the fourth power line 36 is provided with second switching means 38b which controls the flow of the DC power supplied from the second charger 32. Each of the second switching means 38a, 38b is configured to cause power to flow when set to ON, and to cause power not to flow when set to OFF.

Next, a description is given on settings of the switching means 37a, 37b, 38a, 38b when the vehicle on each of the up line 11 and the down line 12 is charged in the charging system 30 of the second embodiment.

FIG. 4 is a table showing combinations of the settings of the switching means 37a, 37b, 38a, 38b when the vehicle on each of the up line 11 and the down line 12 is charged.

Firstly, a description is given of a case in which the vehicle on each of the up line 11 and the down line 12 is charged by using both systems of the first charger (first system) 31 and the second charger (second system) 32 (see "using both systems" in FIG. 4).

When the vehicle stops on each of the up line 11 and the down line 12, each of the communication devices 26 of the up line 11 and the down line 12 sends to the station controller 25 information on the corresponding vehicle which has stopped. Here, if the power storage amounts of both vehicles on the up line 11 and the down line 12 are low, the power storage devices of both vehicles have to be charged.

Here, as shown in FIG. 4, the station controller 25 sets the first switching means 37a to ON while setting the first switching means 37b to OFF. At the same time, the station controller 25 sets the second switching means 38a to OFF while setting the second switching means 38b to ON. This allows the first charger 31 to charge the vehicle on the up line 11, and the second charger 32 to charge the vehicle on the down line 12.

Meanwhile, when the vehicle stops only on the up line 11, or when the vehicle stops on each of the lines but only the power storage amount of the vehicle on the up line 11 is low, only the vehicle on the up line 11 has to be charged.

Here, as shown in FIG. 4, the station controller 25 sets the first switching means 37a to ON and the first switching means 37b to OFF. At the same time, the station controller 25 sets the second switching means 38a to OFF and the second switching means 38b to OFF. This allows the first charger 31 to charge the vehicle on the up line 11.

Meanwhile, when the vehicle stops only on the down line 12, or when the vehicle stops on each of the lines but only the power storage amount of the vehicle on the down line 12 is low, only the vehicle on the down line 12 has to be charged.

Here, as shown in FIG. 4, the station controller 25 sets the first switching means 37a to OFF and the first switching means 37b to ON. At the same time, the station controller 25 sets the second switching means 38a to OFF and the second switching means 38b to OFF. This allows the first charger 31 to charge the vehicle on the down line 12.

Next, a description is given of a case in which a vehicle on each of the lines 11, 12 is charged using only the first system (see "using first system" in FIG. 4).

As shown in FIG. 4, when only the vehicle on the up line 11 is charged, the station controller 25 sets the first switching means 37a to ON and the first switching means 37b to OFF. At the same time, the station controller 25 sets the second switching means 38*a* to OFF and the second switching means 38*b* to OFF. This allows the first charger 31 to charge the vehicle on the up line 11.

Meanwhile, when only the vehicle on the down line 12 is charged, the station controller 25 sets the first switching means 37*a* to OFF and the first switching means 37*b* to ON. At the same time, the station controller 25 sets the second switching means 38*a* to OFF and the second switching means 38*b* to OFF. This allows the first charger 31 to charge the vehicle on the down line 12.

Next, a description is given of a case in which a vehicle on each of the lines 11, 12 is charged using only the second system (see "using second system" in FIG. 4).

As shown in FIG. 4, when only the vehicle on the up line 11 is charged, the station controller 25 sets the first switching means 37*a* to OFF and the first switching means 37*b* to OFF. At the same time, the station controller 25 sets the second switching means 38*a* to ON and the second switching means 38*b* to OFF. This allows the second charger 32 to charge the vehicle on the up line 11.

Meanwhile, when only the vehicle on the down line 12 is charged, the station controller 25 sets the first switching means 37*a* to OFF and the first switching means 37*b* to OFF. At the same time, the station controller 25 sets the second switching means 38*a* to OFF and the second switching means 38*b* to ON. This allows the second charger 32 to charge the vehicle on the down line 12.

As described above, the charging system 30 of the transportation system without the contact wire according to the second embodiment is configured as follows. The station 13 is provided with the up line 11 and the down line 12 arranged in parallel, the station 13 includes the station controller 25 which detects stopping of the vehicle, the charging device includes the first charger 31 and the second charger 32, the first charger 31 includes the first power line 33 supplying power to the vehicle on the up line 11 and the second power line 34 supplying power to the vehicle on the down line 12, the second charger 32 includes the third power line 35 supplying power to the vehicle on the up line 11 and the fourth power line 36 supplying power to the vehicle on the down line 12, the first power line 33 and the second power line 34 respectively include the first switching means 37*a*, 37*b* controlling the flow of the power supplied from the first charger 31, the third power line 35 and the fourth power line 36 respectively include the second switching means 38*a*, 38*b* controlling the flow of the power supplied from the second charger 32, and the station controller 25 controls the first switching means 37*a*, 37*b* and the second switching means 38*a*, 38*b* to cause the charging device to charge any one or both of the vehicle on the up line 11 and the vehicle on the down line 12. This configuration allows the following in the station 13 with multiple lines, for example, the two lines 11, 12. Even in a case in which the vehicle stops on each of the up line 11 and the down line 12, both vehicles can be charged at the same time. Moreover, the vehicle on each of the lines 11, 12 can be charged by any of the first charger 31 and the second charger 32 by controlling the first switching means 37*a*, 37*b* and the second switching means 38*a*, 38*b*. In other words, compared to a configuration in which a charger is simply provided for each of the lines 11, 12, the vehicles on the lines can be charged in various settings by controlling the first switching means 37*a*, 37*b* and the second switching means 38*a*, 38*b*.

Moreover, the station controller 25 heretofore provided in the station is used to control the first switching means 37*a*, 37*b* and the second switching means 38*a*, 38*b*. Thus, unlike the conventional techniques, there is no need to provide a controller separately from a charging device. Accordingly, the equipment cost can be reduced.

Furthermore, according to the charging system 30 of the transportation system without the contact wire of the second embodiment, two chargers of the first charger 31 and the second charger 32 are provided. Thus, even when one of the chargers cannot be used due to failure or the like, the other charger can be used as a backup.

Embodiments of the present invention have been described so far. However, the present invention is not limited to the above described embodiments. Various modifications and changes can be made based on the technical concept of the present invention.

In the above embodiment, the thyristor rectifier 16 is used in the charging device 14, and the power storage device of the vehicle is charged by means of contact. However, the charging device may be a charging power source which supplies high frequency power, and the power storage device of the vehicle may be charged in a contactless manner.

INDUSTRIAL APPLICABILITY

The present invention can provide a charging system for a transportation system without a contact wire which is capable of, in a station with multiple tracks, charging a vehicle on each track while reducing the equipment cost. In addition, the present invention can be applied to a contactless charging device by changing a charging device to a charging power source which supplies high frequency power.

The invention claimed is:

1. A charging system for a transportation system without a contact wire, the charging system comprising:
  a charging device including (i) a first power line for supplying power to a first vehicle having a first power storage device and (ii) a second power line for supplying power to a second vehicle having a second power storage device;
  a switching means including (i) a first switching means for controlling flow of the power supplied to the first vehicle along the first power line, the first switching means being included in the first power line and (ii) a second switching means for controlling flow of the power supplied to the second vehicle along the second power line, the second switching means being included in the second power line,
  wherein the transportation system includes (i) an up line track on which the first vehicle travels in a first direction, (ii) a down line track on which the second vehicle travels in a second direction opposite the first direction, and (iii) a station having a station controller which detects stopping of the first vehicle on the up line track or the second vehicle on the down line track at the station, and
  wherein the station controller controls the switching means to cause the charging device to charge any of the first vehicle on the up line track and the second vehicle on the down line track.

2. A charging system for a transportation system without a contact wire, the charging system comprising:
  a charging device including
    a first charger including (i) a first power line for supplying power to a first vehicle having a first power storage device and (ii) a second power line for supplying power to a second vehicle having a second power storage device, and a second charger including (i) a third power line for supplying power to the first vehicle and (ii) a fourth power line for supplying power to the second vehicle; and a switching means including (i) a first switching means for controlling flow of the power supplied from the first charger to the first vehicle along the first power line, the first switching means being included in the first power line, (ii) a second switching means for controlling flow of the power supplied from the first charger to the second vehicle along the second power line, the second switching means being included in the second power line, (iii) a third switching means for controlling flow of the power supplied from the second charger to the first vehicle along the third power line, the third switching means being included in the third power line, (iv) a fourth switching means for controlling flow of the power supplied from the second charger to the second vehicle along the fourth power line, the fourth switching means being included in the fourth power line, wherein the transportation system includes (i) an up line track on which the first vehicle travels in a first direction, (ii) a down line track on which the second vehicle travels in a second direction opposite the first direction, and (iii) a station having a station controller which detects stopping of the first vehicle on the up track or the second vehicle on the down line track at the station, and wherein the station controller controls the first switching means, the second switching means, the third switching means, and the fourth switching means to cause the charging device to charge any one or both of the first vehicle on the up line track and the second vehicle on the down line track.

* * * * *